US012125346B2

(12) United States Patent
Maya et al.

(10) Patent No.: US 12,125,346 B2
(45) **Date of Patent: *Oct. 22, 2024**

(54) SIDE BETS FOR AN ELECTRONIC TABLE GAME

(71) Applicant: IGT, Las Vegas, NV (US)

(72) Inventors: Darren Maya, Reno, NV (US); Paul Baskerville, Las Vegas, NV (US); Donald W. Humphreys, Reno, NV (US); Patrick Issertell, Bridgton, NJ (US); Ben Holsclaw, Sparks, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,092

(22) Filed: Jul. 10, 2023

(65) Prior Publication Data

US 2023/0351846 A1 Nov. 2, 2023

Related U.S. Application Data

(63) Continuation of application No. 17/547,478, filed on Dec. 10, 2021, now Pat. No. 11,727,753.

(60) Provisional application No. 63/124,607, filed on Dec. 11, 2020.

(51) Int. Cl.
*G07F 17/32* (2006.01)

(52) U.S. Cl.
CPC ...... *G07F 17/3244* (2013.01); *G07F 17/3225* (2013.01); *G07F 17/3262* (2013.01); *G07F 17/3293* (2013.01)

(58) Field of Classification Search
CPC ............. G07F 17/3244; G07F 17/3225; G07F 17/3262; G07F 17/3293
USPC .............................................................. 463/25
See application file for complete search history.

(56) References Cited

U.S. PATENT DOCUMENTS

| | | | | |
|---|---|---|---|---|
| 6,659,461 | B2 | 12/2003 | Yoseloff et al. | |
| 7,066,465 | B2 | 6/2006 | Daines et al. | |
| 7,175,180 | B2 | 2/2007 | Webb | |
| 7,185,891 | B2 | 3/2007 | Jackson | |
| 8,087,983 | B2 | 1/2012 | Longway | |
| 9,305,434 | B2 | 4/2016 | Iddings | |
| 9,336,650 | B2 | 5/2016 | Naylor et al. | |
| 9,336,657 | B2 | 5/2016 | Rudd et al. | |
| 9,811,980 | B1 | 11/2017 | Kowalchuk et al. | |
| 10,311,681 | B2 | 6/2019 | Litman | |
| 10,964,157 | B2 | 3/2021 | Morin | |
| 11,127,261 | B2 | 9/2021 | Moskowitz | |
| 2005/0051960 | A1* | 3/2005 | Snow | G07F 17/32 273/274 |
| 2007/0290444 | A1 | 12/2007 | Moses | |
| 2009/0093300 | A1* | 4/2009 | Lutnick | G07F 17/3293 463/31 |
| 2009/0104963 | A1* | 4/2009 | Burman | G07F 17/3223 463/22 |
| 2009/0179378 | A1* | 7/2009 | Amaitis | A63F 3/00157 273/292 |
| 2009/0224478 | A1* | 9/2009 | Evans | G07F 17/3293 463/13 |
| 2010/0311488 | A1* | 12/2010 | Miller | A63F 1/12 463/31 |

(Continued)

*Primary Examiner* — Pierre E Elisca
(74) *Attorney, Agent, or Firm* — Neal, Gerber & Eisenberg LLP

(57) ABSTRACT

Gaming systems and methods that offer side bets in a multi-hand game.

20 Claims, 14 Drawing Sheets

(56) References Cited

U.S. PATENT DOCUMENTS

| | | | | |
|---|---|---|---|---|
| 2010/0311489 | A1* | 12/2010 | Miller | A63F 1/12 463/31 |
| 2010/0311490 | A1* | 12/2010 | Miller | G07F 17/3293 463/16 |
| 2011/0278795 | A1 | 11/2011 | Denke | |
| 2015/0279165 | A1 | 10/2015 | Kock | |
| 2016/0078726 | A1 | 3/2016 | Blaine | |
| 2016/0136514 | A1 | 5/2016 | Laduca et al. | |

* cited by examiner

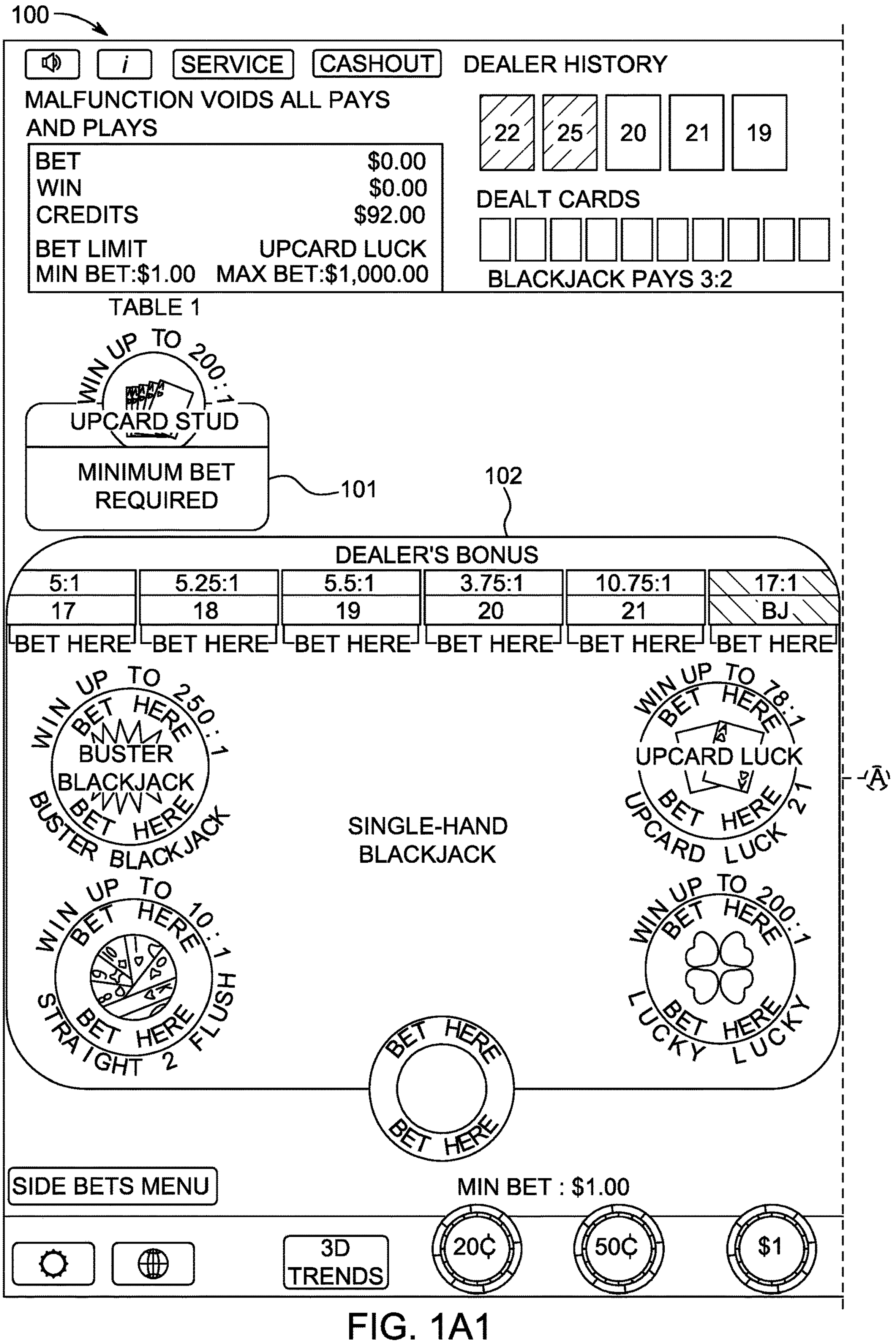
FIG. 1A1

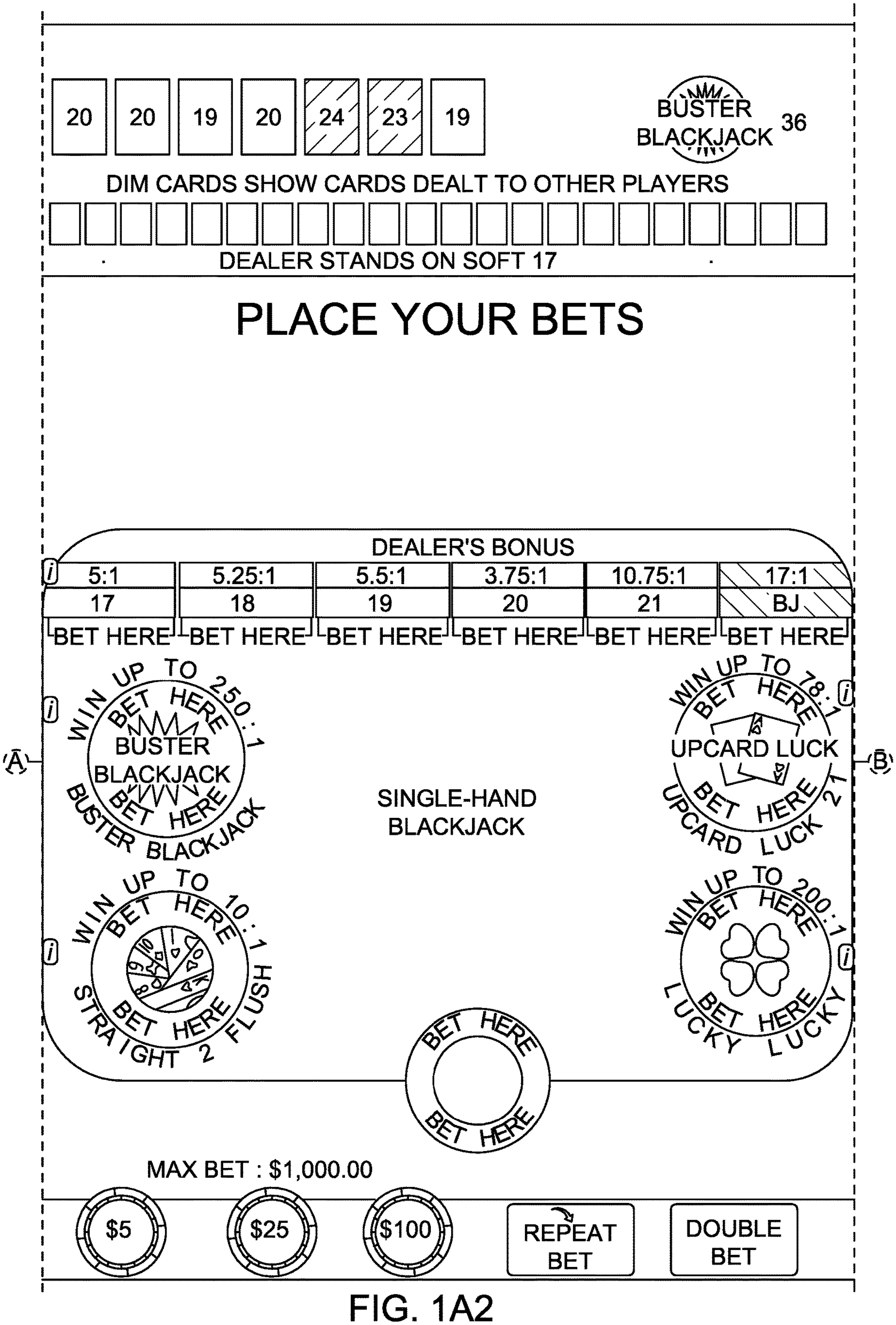
FIG. 1A2

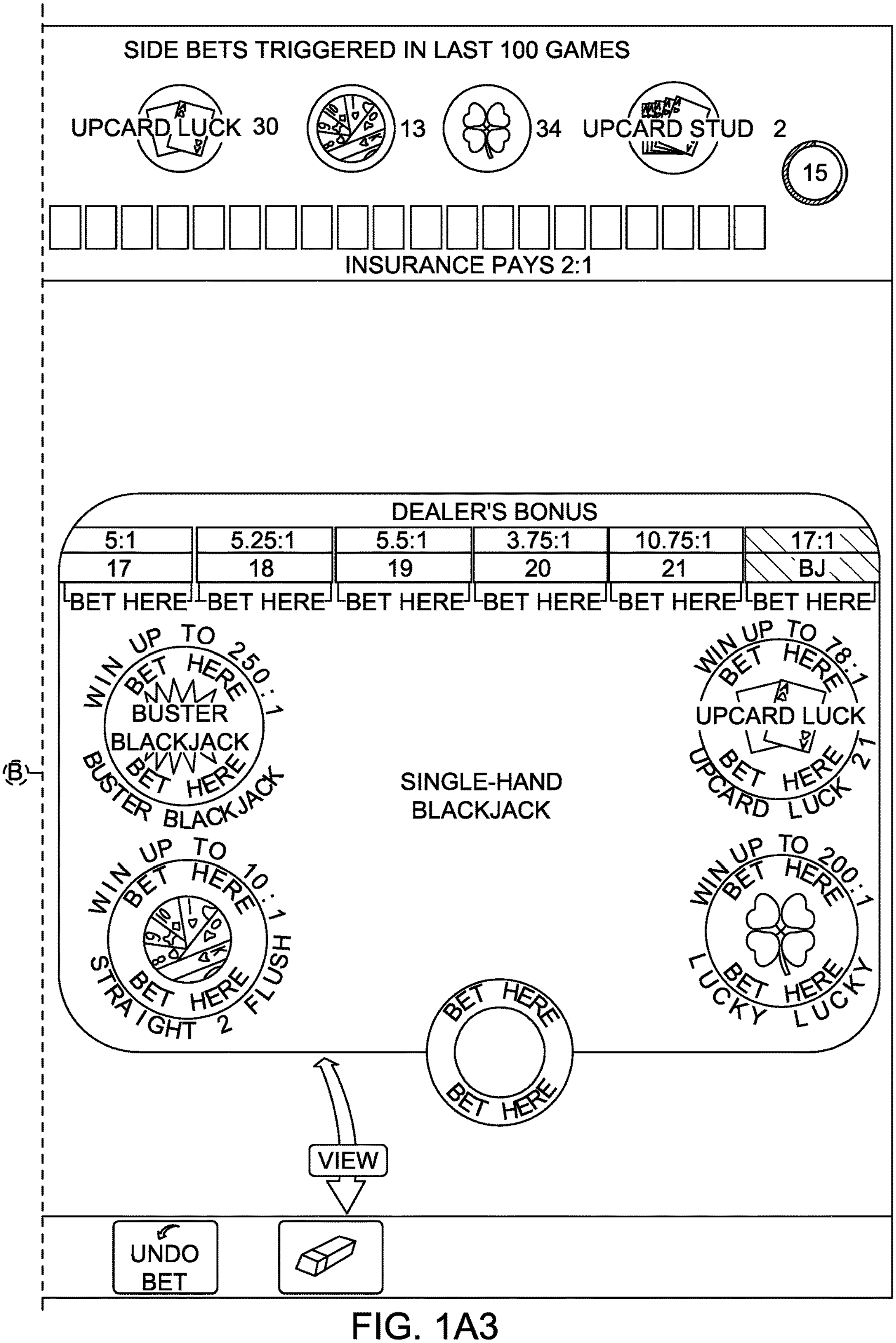
FIG. 1A3

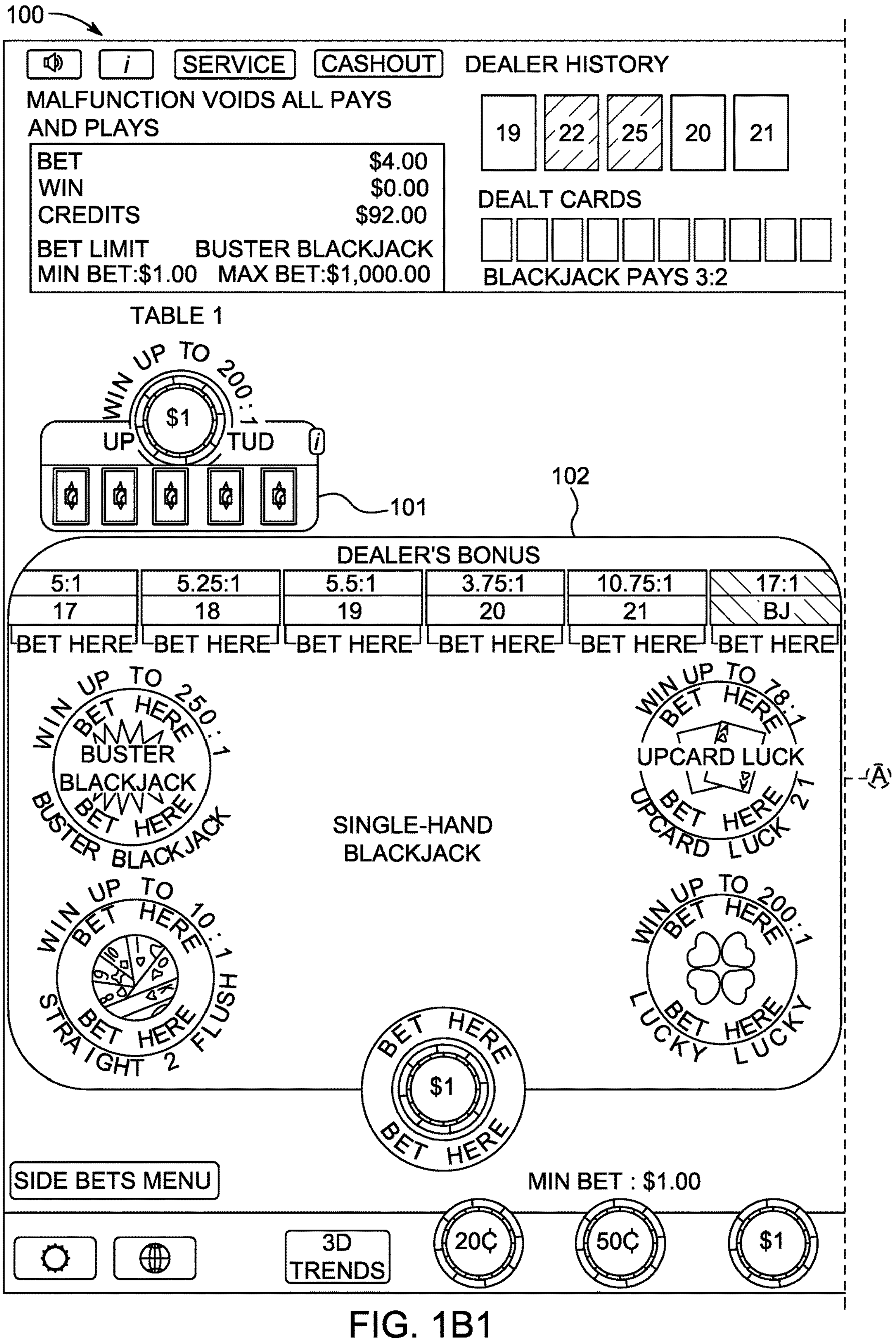
FIG. 1B1

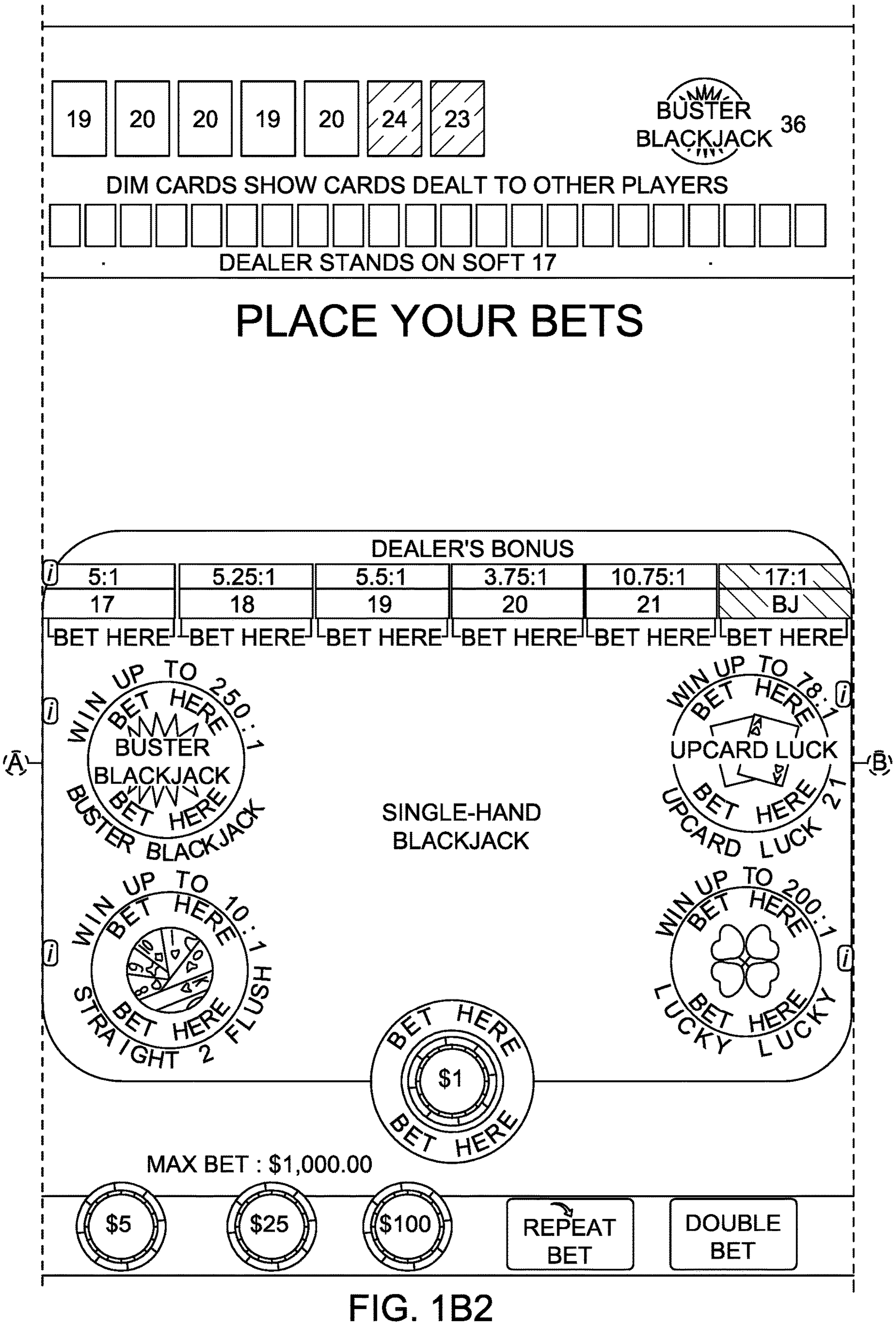
FIG. 1B2

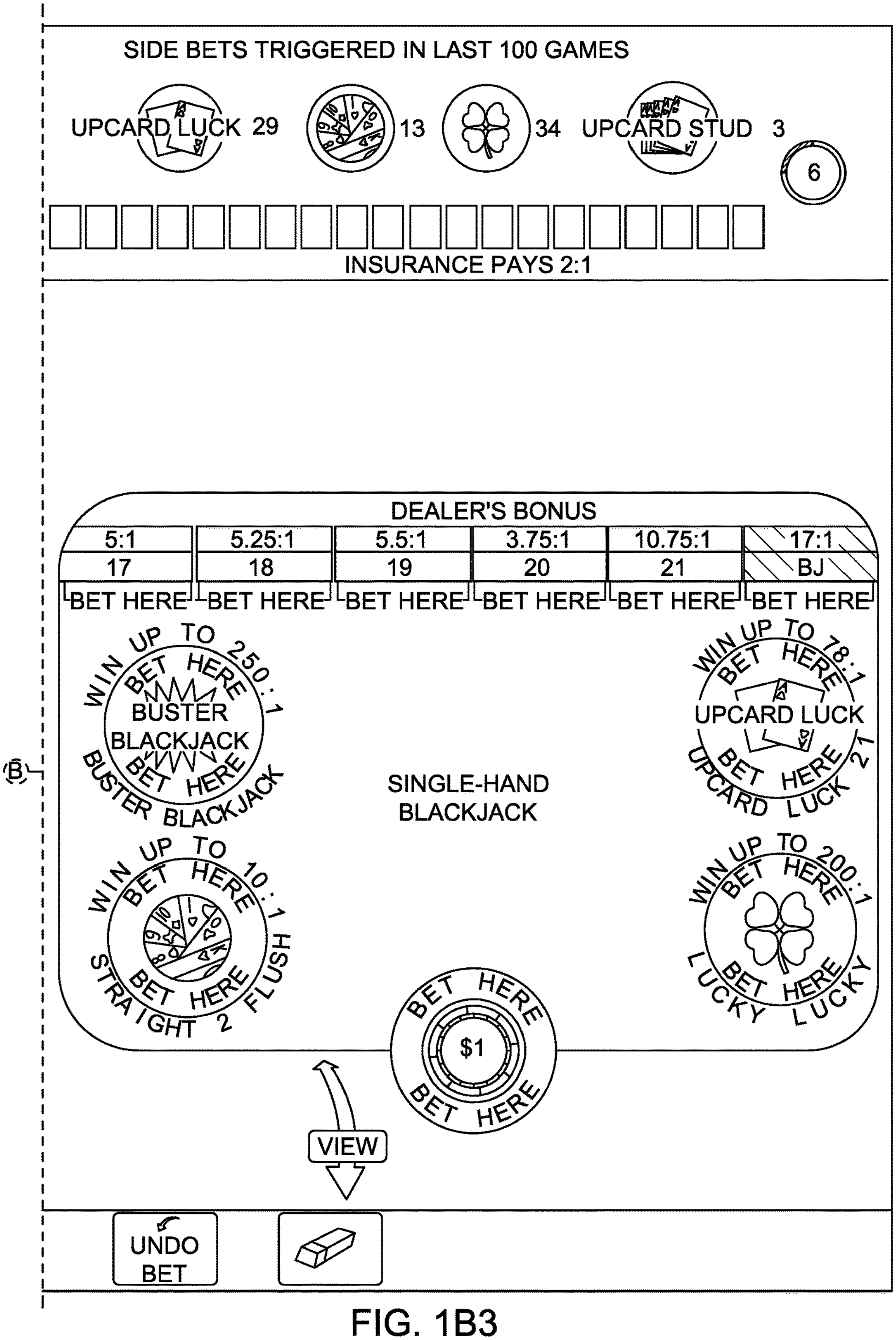
FIG. 1B3

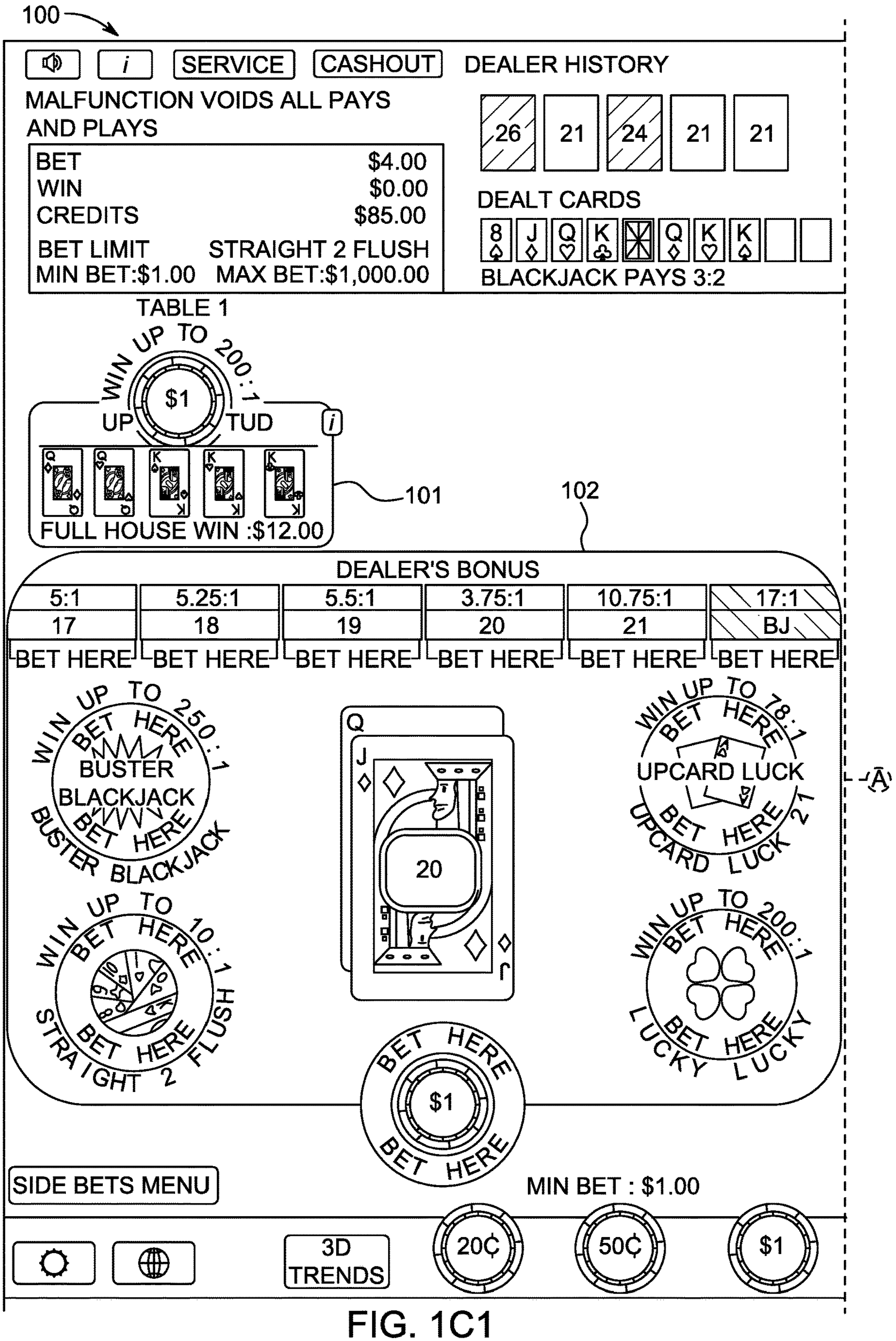
FIG. 1C1

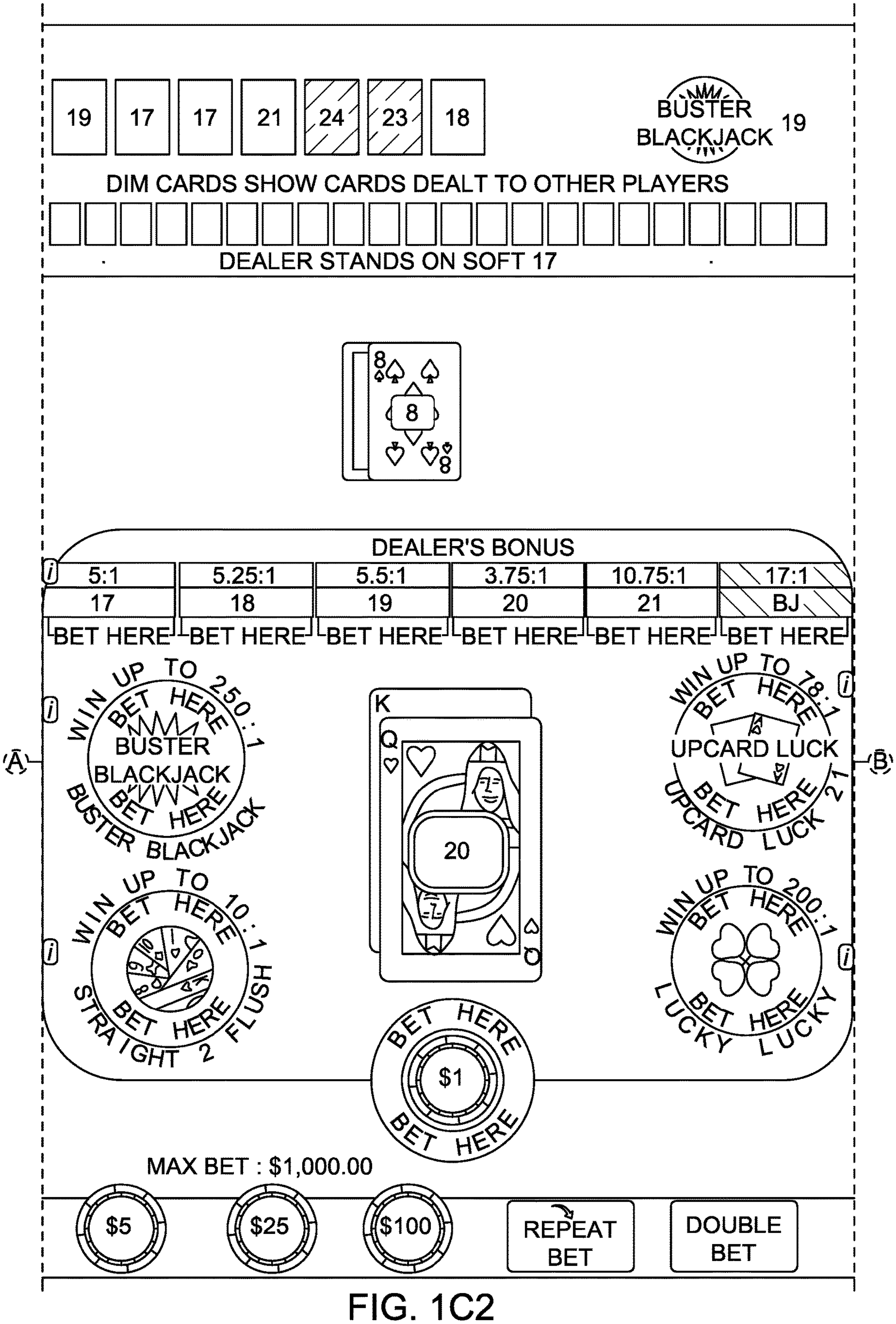
FIG. 1C2

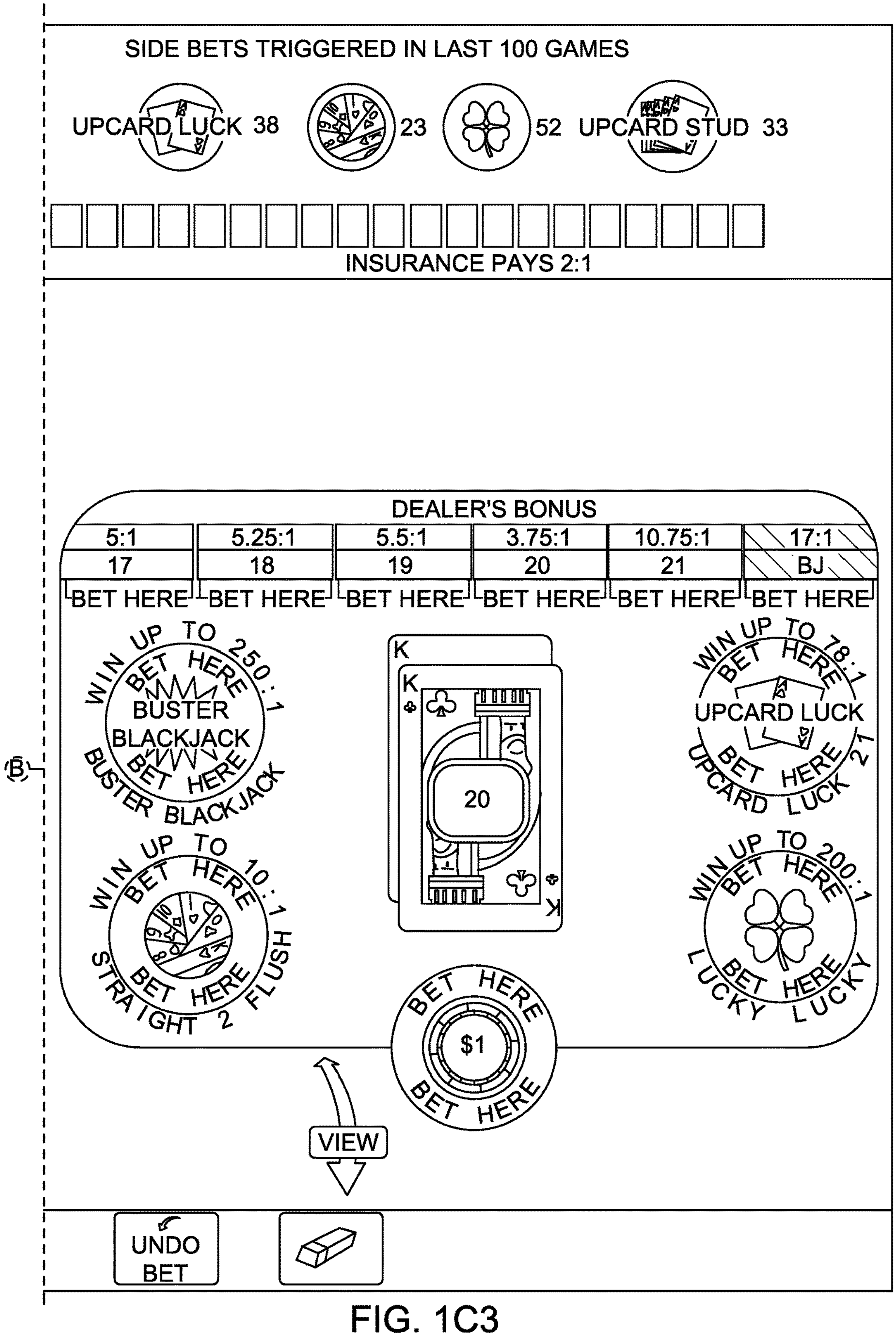
FIG. 1C3

BONUS POKER DELUXE PAYTABLE ID P466

| HAND TYPE | PAY/CI | MAX PAY/CI | PROBABILITY | CONTRIBUTION |
|---|---|---|---|---|
| ROYAL FLUSH | 800 | 4000 | 0.0000017 | 0.014 |
| STRAIGHT FLUSH | 400 | 400 | 0.0000012 | 0.014 |
| FOUR OF A KIND | 160 | 160 | 0.0001177 | 0.081 |
| FULL HOUSE | 24 | 24 | 0.0006196 | 0.130 |
| FLUSH | 15 | 15 | 0.0002811 | 0.150 |
| STRAIGHT | 10 | 10 | 0.0010275 | 0.112 |
| THREE OF A KIND | 7 | 7 | 0.0084513 | 0.158 |
| TWO PAIR | 3 | 3 | 0.0175850 | 0.154 |
| JACKS OR BETTER | 2 | 2 | 0.0907784 | 0.182 |

| | |
|---|---|
| HIT FREQUENCY | 11.886% |
| OPTIMUM MAX COIN PLAYER RETURN | 99.450% |
| OPTIMUM ONE COIN PLAYER RETURN | 98.635% |
| EXPECTED FIELD RETURN | 95.450 To 97.450% |

FIG. 2

Lucky 8s
Hard and soft 8s count towards the total number of 8s during the hand. More 8s equals a higher payout
Examples of possible combinations shown below.
301
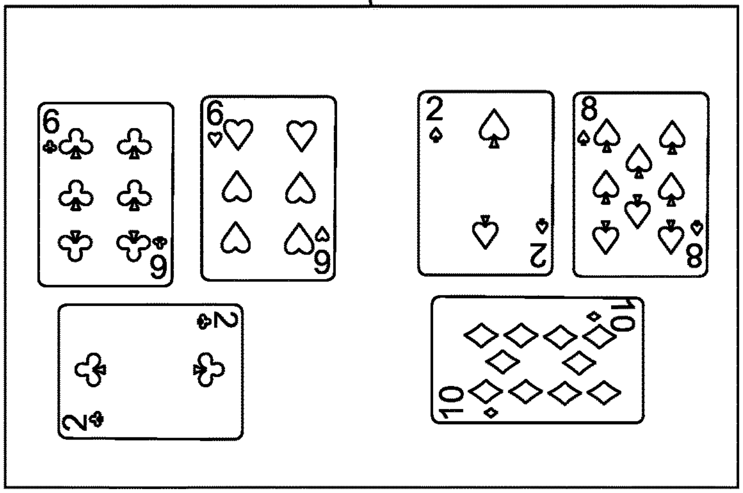
1 hard 8 shown
Total = 1 x 8 = 1:1
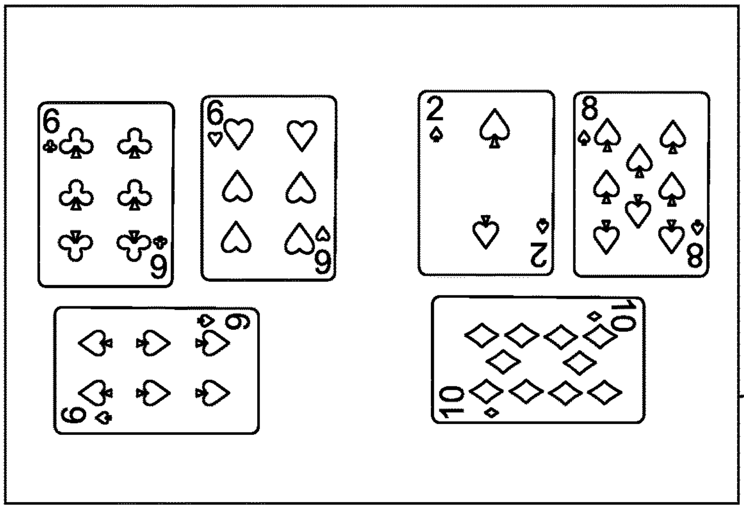
1 hard and 1 soft 8 shown
Total = 2 x 8 = 3:1
302
FIG. 3A

SIDE BETS FOR AN ELECTRONIC TABLE GAME

PRIORITY CLAIM

This application is a continuation of, claims priority to and the benefit of U.S. patent application Ser. No. 17/547,478, filed on Dec. 10, 2021, which claims priority to and the benefit of U.S. Provisional Application No. 63/124,607, filed on Dec. 11, 2020, the entire contents of which are each incorporated by reference herein.

BACKGROUND

The present disclosure relates generally to gaming systems and, in particular, to offering side bets in a multi-hand game.

Electronic table games ("ETGs"), in particular, combine elements, such as a live dealer and physical table game elements, with electronic interfaces for managing wagers. ETGs offer electronic versions of table games such as blackjack, roulette, baccarat, three-card poker, etc. In card and non-card games of chance, casinos may use proposition bets or side bets. A "side bet" (e.g., prop bet, prop, novelty, proxy bet, or backbet) is a bet made regarding the occurrence or non-occurrence during a game of an event not directly affecting the game's final outcome. Examples of side bets include 21+3, Royal Match, Over/Under 13, Super Sevens, Lucky Ladies, and Pair Square in blackjack, to name a few.

BRIEF DESCRIPTION OF THE DRAWINGS

FIGS. 1A1, 1A2, and 1A3 (collectively FIG. 1A); 1B1, 1B2 and 1B3 (collectively FIG. 1B); and 1C1, 1C2, and 1C3 (collectively FIG. 1C) depict example graphical user interfaces illustrating an ETG of a three-hand blackjack game which offers a poker side bet.

FIG. 2 depicts an example paytable for a poker side bet.

FIGS. 3A and 3B depict example hand outcomes for a Lucky 8 side bet that can be offered in an ETG of a baccarat game.

DETAILED DESCRIPTION

Poker Side Bet

Figure 3B:
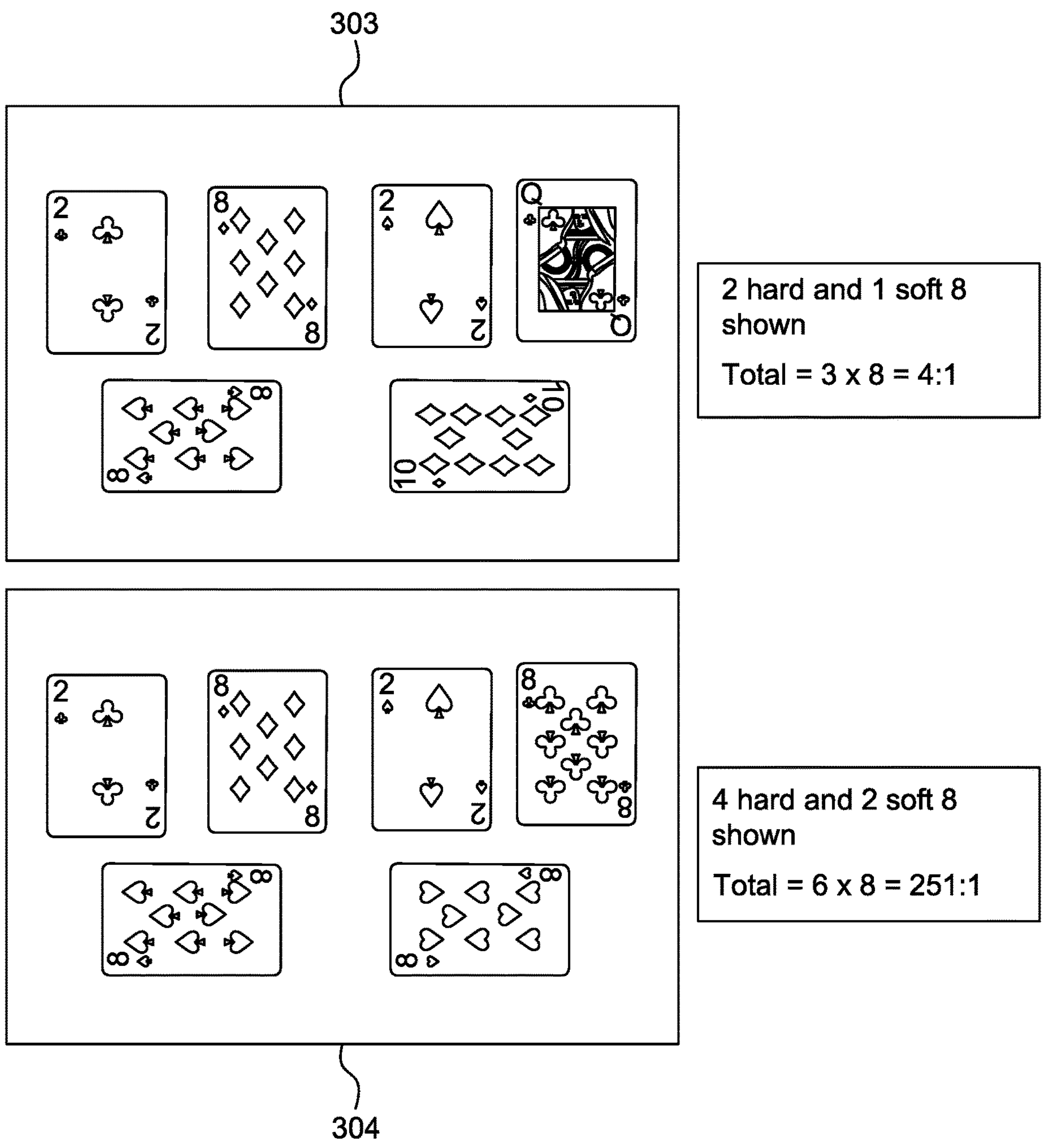

FIGS. 1A, 1B, and 1C depict example graphical user interfaces of an ETG of a three-hand blackjack game which offers a poker side bet. Each of these figures depict a graphical user interface ("GUI") 100 illustrating an ETG at various stages of the three-hand blackjack game. The GUI 100 includes three bet spots 102 and a poker side bet 101. The GUI 100 of the ETG can be displayed by a processor and display device of an electronic gaming machine ("EGM") such as the example ETG terminal depicted in FIG. 4. Accordingly, an EGM of the present disclosure refers to any suitable electronic gaming machine or kiosk which enables a player to play one or more games and/or place one or more wagers, wherein the EGM comprises, but is not limited to: a slot machine, a video poker machine, a video lottery terminal, a terminal associated with an electronic table game (e.g., an ETG terminal), a gaming table component associated with a non-intelligent gaming table, a video keno machine, a video baccarat machine, a historical horse racing machine, a video bingo machine, and/or a sports betting terminal.

The poker side bet 101 allows the player to wager on whether a selected five of the seven face up cards of a three-hand blackjack game will form a successful five-card, stud poker hand. Unlike most blackjack side bets which rely solely on cards from a single player's hand or a single player's hand and a dealer's hand, the poker side bet 101 considers cards from across multiple hands resulting in more than the typical number of cards being utilized for a side bet. In three-hand blackjack for example, the seven face up cards include the six cards dealt face up for the player's three blackjack hands, two cards for each hand in each of the three bet spots 102, and the single card that a dealer will place face up for his or her hand of blackjack. The seven face up cards are analyzed by a processor of the ETG terminal (and/or a server in communication with the ETG terminal) to determine the highest ranked five-card poker hand which can be formed using five of the seven shown cards. The player is then paid based on a paytable, such as the example paytable in FIG. 2, according to the resulting hand which is formed from five of the seven cards.

FIG. 1A depicts a state of the GUI 100 for the three-hand blackjack game prior to the placement of any bets by a player. From this screen, a player can review the available bet options and place bets by dragging one or more chips to the available bet spots 102 or the poker side bet 101. The player can also select their chip denomination and then touch the various bet options to place a bet of the selected denomination at those spots. Each of the bet spots 102 includes a central bet spot located at the bottom center which activates that bet spot and indicates that the player wishes to play a blackjack hand at that location. The player may, for example, only play one or two hands by placing bets on just one or two of the central bet spots of the bet spots 102. Each of the bet spots 102 also include four side bets which, unlike the poker side bet 101 which utilizes all three blackjack hands, are specific to hands dealt to a particular bet spot of the bet spots 102. For example, a bet placed on the "Buster Blackjack" side bet on the left most bet spot of the bet spots 102 only applies to the cards dealt to that left bet spot and does not consider the cards dealt to the other two bet spots.

FIG. 1B depicts a state of the GUI 100 after the player has placed bets on each of the three bet spots 102 and on the poker side bet 101. By placing a bet on the central bet spot of each of the bet spots 102 and the poker side bet 101, the player has activated those bets for the next round of blackjack. In some implementations, since the poker side bet 101 utilizes all three blackjack hands, a player may be prevented from placing a bet on the poker side bet 101 until the player has placed a bet on the central bet spot of each of the bet spots 102 indicating that player is going to play three hands, one at each of the bet spots 102. The poker side bet 101 may be visually modified to indicate that the bet is unavailable (e.g., grayed out, darkened, or dimmed) until the player has placed bets to activate all three hands, and then, after the bets have been placed, the poker side bet 101 may again be visually modified to indicate that the bet is available to be placed (e.g., illuminated, changed to color from black and white or gray, etc.). Once a bet is placed on the poker side bet 101, the graphics of the poker side bet 101 are modified to indicate that the bet is activated and to depict five card backs which represent the five cards which will be selected for a poker hand. After the timer in the top right corner of the GUI 100 expires, a round of the three-hand blackjack game begins, and cards are dealt.

FIG. 1C depicts a state of the GUI 100 after three blackjack hands and a dealer's blackjack hand have been dealt. After the cards have been dealt, a processor of the ETG identifies the seven available cards and executes an algorithm to determine the best or highest ranking five card poker hand which can be formed. The hand rankings are determined based on a paytable for the poker side bet 101. After the five card hand is determined, the poker side bet 101 graphic in the GUI 100 is updated to depict the five of seven face up cards which were selected for the best possible poker hand. In FIG. 1C, the player has obtained a full house using the two kings from the right most hand, the king and queen from the middle hand, and the queen from the left hand. The jack of diamonds from the left hand and the eight of spades from the dealer's hand are not used for the poker side bet 101 as using these cards would not result in the best, highest ranking poker hand. Once the hand is formed, the player may be paid immediately, or the player may be paid after the resolution of the three hands of blackjack which are played as normal, independently of the poker side bet 101. The player is paid according to a paytable such as the example paytable in FIG. 2 which would pay the player twenty-four times the initial bet for the full house hand outcome. After the three hands and all bets are resolved, the GUI 100 returns to the state depicted in FIG. 1A which allows a player to place bets for another round.

Variations to the above described poker side bet 101 are possible. In some implementations, after the cards are dealt and a five card poker hand is determined from the seven face up cards for the poker side bet 101, a player may be given the option to take the payout from the currently selected poker hand or forego the payout or place a second bet in exchange for the chance to improve their hand by using the dealer's face down card in their formed poker hand once the card is revealed. For example, if a player is dealt a 3 of a kind hand from the initial seven face up cards, the player may want to push their luck by placing a second bet or foregoing the 3 of a kind payout for the chance of the dealer's face down card providing a greater payout by, for example, improving their hand to be 4 of a kind. Some implementations may also enable to the player to use cards for the poker side bet 101 which are dealt based on the player hitting, splitting, or doubling down or based on the dealer hitting. In each of these implementations, as the number of available cards increases, the processor of the ETG terminal (and/or the server in communication with the ETG terminal) may continuously evaluate all available cards to determine the highest ranking poker hand which can be formed with a subset of the available cards.

In other implementations, a player may not be required to bet and play all three hands of blackjack. The player may only play one or two hands leading to only 3 or 5 cards, respectively, being used to form a poker hand for the poker side bet 101. For example, if the player only elects to play one hand of blackjack, the two face up cards from the player's hand and the single face up card from the dealer's hand are used to form a poker hand. In this instance, payouts for poker hands which require only three cards, such as a pair or 3 of a kind, may remain active while payouts for hands which require more than three cards, such as a royal flush or 4 of a kind, would be inactive as these hands are not possible.

In other implementations, more than five of the seven face up cards may be selected for the poker side bet 101. For example, six or seven cards may be used in instances where hands such as 6 of a kind, 7 of a kind, 6 card straights, 7 card straights, etc., can be formed. Since blackjack games often use multiple decks, 6 of a kind and 7 of a kind hands would be possible and the paytable could provide for greater payouts for such hands.

Although described above as being applied to blackjack, the poker side bet 101 could also be offered for other card-based games in which multiple hands can be played. For example, the poker side bet 101 could be offered for three-card poker, Pai Gow poker, baccarat, etc. In each of these games, the poker side bet would operate similarly by determining the best possible five card poker hand using available face up cards across all hands being played by a player.

Although described above as being executed on an ETG terminal, the poker side bet 101 could also be offered at a gaming table, such as at an intelligent blackjack table or a non-intelligent blackjack table. The poker side bet would function in a similar manner as described above by utilizing cards from a player who is playing three hands of blackjack. Alternatively, in addition to spanning multiple hands, the poker side bet could span multiple players at a table. Three or more players at a table can elect to ante or pool their bets to enter the poker side bet. The cards from each player's hand which entered the side bet would be utilized to determine the best possible poker hand and the resulting payout may be paid to each player or split among the players. When being used at a gaming table, computer assistance could be supplied to the dealer for determining the best possible poker hand since dealers are likely unable to timely and reliably determine the highest ranking poker hand from the available cards using just the human mind. For example, a camera may be used to identify the available cards, and a processor used to analyze the available cards and indicate the best hand achieved by the player to the dealer.

Lucky 8's Side Bet

FIGS. 3A and 3B depict potential hand outcomes for a Lucky 8 side bet that can be offered on an ETG terminal with a baccarat game. FIGS. 3A and 3B depict potential outcomes 301-304 which illustrate example outcomes for a round of baccarat and a Lucky 8 side bet. The Lucky 8 side bet pays a player based on the number of hard or soft 8s which are dealt to either the player or the dealer, referred to as a banker in baccarat, during a round of baccarat. A single 8 dealt results in a lower payout compared to the maximum possible six 8s dealt which results in a maximum payout for the Lucky 8s side bet.

In baccarat, cards have a point value: the 2 through 9 cards in each suit are worth face value (in points); the 10, jack, queen, and king have no point value (i.e. are worth zero); aces are worth 1 point; jokers are not used. Hands are valued according to a units digit sum of their constituent cards. For example, a hand consisting of 2 and 3 is worth 5, but a hand consisting of 6 and 7 is worth 3 (i.e., the 3 being the units digit in the combined points total of 13). The highest possible hand value in baccarat is therefore nine.

For the Lucky 8 side bet, a hard eight refers to an actual eight card which is dealt to the player or the banker, and a soft eight refers to a hand's value being equal to eight. By also considering soft eights, one round of baccarat has the potential to reach a maximum of 6 eights, 4 hard eights in a single deck of cards and 2 soft eights, with one soft eight being based on the value of the player's hand and the other soft eight being based on the value of the banker's hand.

In potential outcome 301 shown in FIG. 3A, a player's hand (left) includes two 6s and a 2, and a banker's hand (right) includes a 2, 8, and 10. Based on the dealt cards, the potential outcome 301 includes only a single 8, which is a hard eight that was dealt to the banker. The single 8 results in a payout of 1:1.

In potential outcome 302, a player's hand (left) includes three 6s and a banker's hand (right) includes a 2, 8, and 10. Based on the dealt cards, the potential outcome 302 includes one hard 8 and one soft 8, the hard eight being the 8 that was dealt to the banker and the soft eight being based on the value of the player's hand (6+6+6=18, which has a value of 8 in baccarat). The two 8s result in a payout of 3:1.

In potential outcome 303 shown in FIG. 3B, a player's hand (left) includes two 8s and a 2, and a banker's hand (right) includes a 2, 10, and Queen. Based on the dealt cards, the potential outcome 303 includes two hard eights and one soft eight, the two hard eights being the 8s dealt to the player and the soft eight being based on the value of the player's hand (2+8+8=18, which has a value of 8 in baccarat). The three 8s result in a payout of 4:1.

In potential outcome 304, a player's hand (left) includes two 8s and a 2, and a banker's hand (right) includes two 8s and a 2. Based on the dealt cards, the potential outcome 304 includes four hard eights and two soft eights, the four hard eights being the 8s dealt to the player and the banker and the soft eight being based on the value of the player's hand and the banker's hand (2+8+8=18, which has a value of 8 in baccarat). The six 8s, which is the maximum number of 8s possible, result in a payout of 251:1.

Figure 4:
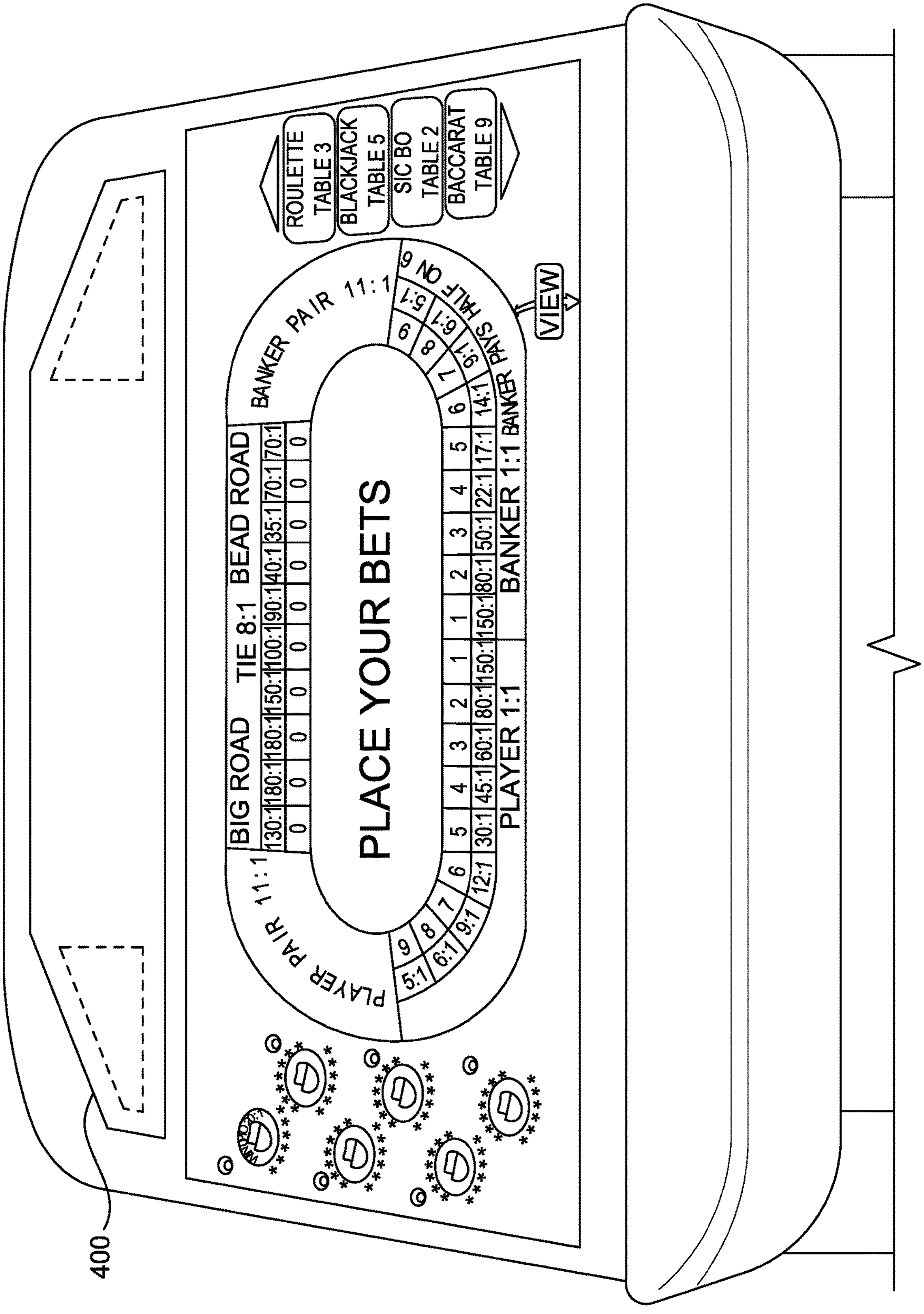
FIG. 4 depicts an example terminal for providing an ETG.

An ETG terminal (and/or a server in communication with the ETG terminal), such as the ETG terminal depicted in FIG. 4, will analyze the dealt cards and the value of the player's and banker's hands to determine an outcome of the Lucky 8s side bet. The processor of the ETG terminal (and/or a server in communication with the ETG terminal) will then reward a player according to a paytable associated with the Lucky 8s side bet.

Variations on the Lucky 8s side bet as described above are possible. For example, different payouts may be offered, and a different number may be used. The numbers could be any number that can have a hard and soft value in baccarat, such as 0, 1, 2, 3, 4, 5, 6, 7, 8, and 9. For example, the bet could be a Lucky 7s side bet and operate in a similar manner by identifying hard and soft 7s instead of 8s. If the bet were Lucky 0s, 10 cards and face cards could be considered hard 0s, and any two or three sets of cards that are all tens or face cards would be a soft 0 due to their value in baccarat.

The Lucky 8 side bet may have the following example rules to be shown to a player:

Game Rules

SIDE BETS

LUCKY 8'S

Place chips in the 'Lucky 8's' side bet area to bet that one or more card values or point totals will contain an 8. That side bet is won if the Player hand or Banker hand ends with a point total of 8 (Soft 8) or if the Player hand or Banker hand contains one or more cards with a face value of 8 (Hard 8).

Only the highest Lucky 8's win is paid. Wins are paid according to the total number of Hard 8's and Soft 8's between the Player hand and Banker hand at the end of the game.

Lucky 8's Pays:

| Total Number of Hard 8's and Soft 8's | Pays |
|---|---|
| 6 | [xx] to 1 |
| 5 | [xx] to 1 |
| 4 | [xx] to 1 |
| 3 | [xx] to 1 |
| 2 | [xx] to 1 |
| 1 | PUSH |

Although described above as being executed on an ETG terminal, the Lucky 8 side bet could also be offered at a gaming table, such as at an intelligent baccarat table or a non-intelligent baccarat table. The Lucky 8 side bet would function in a similar manner as described above by utilizing the dealt cards and the value of the player's and banker's hands. In certain instances when being used at a gaming table, computer assistance could be supplied to the dealer for determining the outcome of such Lucky 8 side bets. For example, a camera may be used to identify the dealt cards and the value of the player's and banker's hands, and a processor used to analyze the dealt cards and the value of the player's and banker's hands to determine the outcome of such Lucky 8 side bets.

It should be appreciated that the present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

In certain embodiments, the EGM includes a master gaming controller configured to communicate with and to operate with a plurality of peripheral devices.

The master gaming controller includes at least one processor. The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface of the master gaming controller; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices (such as input/output devices); and/or (5) controlling the peripheral devices. In certain embodiments, one or more components of the master gaming controller (such as the at least one processor) reside within a housing of the EGM (described below), while in other embodiments at least one component of the master gaming controller resides outside of the housing of the EGM.

The master gaming controller also includes at least one memory device, which includes: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device resides within the housing of the EGM (described below), while in other embodiments at least one component of the at least one memory device resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings for a game playable on the EGM; (2) associations between configuration indicia read from an EGM with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller communicates with other devices using a serial communication protocol. A few non-limiting examples of serial communication protocols that other devices, such as peripherals (e.g., a bill validator or a ticket printer), may use to communicate with the master game controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device also stores a plurality of device drivers. Examples of different types of device drivers include device drivers for EGM components and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device can be upgraded as needed. For instance, when the at least one memory device is a hard drive, new games, new game options, new parameters, new settings for existing parameters, new settings for new parameters, new device drivers, and new communication protocols can be uploaded to the at least one memory device from the master game controller or from some other external device. As another example, when the at least one memory device includes a CD/DVD drive including a CD/DVD configured to store game options, parameters, and settings, the software stored in the at least one memory device can be upgraded by replacing a first CD/DVD with a second CD/DVD. In yet another example, when the at least one memory device uses flash memory or EPROM units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device also stores authentication and/or validation components configured to authenticate/validate specified EGM components and/or information, such as hardware components, software components, firmware components, peripheral device components, user input device components, information received from one or more user input devices, information stored in the at least one memory device, etc.

In certain embodiments, the peripheral devices include several device interfaces, such as: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one player/device tracking module; and (14) at least one information filtering module.

The at least one output device includes at least one display device configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device may include any suitable device that enables an input signal to be produced and received by the at least one processor of the EGM.

In one embodiment, the at least one input device includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof.

In one embodiment, the at least one input device includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. In other embodiments, the EGM begins game play automatically upon appropriate funding rather than upon utilization of the game play activation device.

In other embodiments, the at least one input device includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance.

In various embodiments, the at least one input device includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick).

In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device includes a card reader in communication with the at least one processor of the EGM. The card reader is configured to read a player identification card inserted into the card reader.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component is configured to distribute power to one or more internal components of the EGM, such as one or more rechargeable power sources (e.g., rechargeable batteries) located at the EGM.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component is configured to detect or sense one or more events and/or conditions that, for example, may result in damage to the EGM and/or that may result in loss of information associated with the EGM. Additionally, the data preservation system may be operable to initiate one or more appropriate action(s) in response to the detection of such events/conditions.

The at least one motion/gesture analysis and interpretation component is configured to analyze and/or interpret information relating to detected player movements and/or gestures to determine appropriate player input information relating to the detected player movements and/or gestures. For example, in one embodiment, the at least one motion/gesture analysis and interpretation component is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source enables the EGM to operate in a mobile environment. For example, in one embodiment, the EGM includes one or more rechargeable batteries.

The at least one geolocation module is configured to acquire geolocation information from one or more remote sources and use the acquired geolocation information to determine information relating to a relative and/or absolute position of the EGM. For example, in one implementation, the at least one geolocation module is configured to receive GPS signal information for use in determining the position or location of the EGM. In another implementation, the at least one geolocation module is configured to receive multiple wireless signals from multiple remote devices (e.g., EGMs, servers, wireless access points, etc.) and use the signal information to compute position/location information relating to the position or location of the EGM.

The at least one user identification module is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module is configured to perform filtering (e.g., based on specified criteria) of selected information to be displayed at one or more displays of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb sticks, ticket readers, touch screens, trackballs, touchpads, wheels, and wireless communication devices.

As generally described above, in certain embodiments, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting.

In certain embodiments, the EGM is a device that has obtained approval from a regulatory gaming commission, and in other embodiments, the EGM is a device that has not obtained approval from a regulatory gaming commission.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo game, a keno game, a lottery game and/or a historical horse race (i.e., a previously held race wherein certain information is anonymized to prevent a player from determining the results prior to the running of the historical horse race). In certain such embodiments, the gaming system utilizes one or more bingo games, keno games, lottery games and/or historical horse races to determine the predetermined game outcome and/or award provided for a primary game and/or a secondary game.

In certain examples of using bingo games to determine a predetermined game outcome, the gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, video baccarat games; video keno games; video bingo games; historical horse races; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled “Server Based Gaming System and Method for Selectively Providing One or More Different Tournaments”; U.S. Pat. No. 8,500,548, entitled “Gaming System and Method for Providing Team Progressive Awards”; and U.S. Pat. No. 8,562,423, entitled “Method and Apparatus for Rewarding Multiple Game Players for a Single Win”.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player’s gaming activity. In one such embodiment, the player tracking system does so through the use of player tracking cards. In this embodiment, a player is issued a player identification card that has an encoded player identification number that uniquely identifies the player. When the player’s playing tracking card is inserted into a card reader of the gaming system to begin a gaming session, the card reader reads the player identification number off the player tracking card to identify the player. The gaming system timely tracks any suitable information or data relating to the identified player’s gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player’s account number, the player’s card number, the player’s first name, the player’s surname, the player’s preferred name, the player’s player tracking ranking, any promotion status associated with the player’s player tracking card, the player’s address, the player’s birthday, the player’s anniversary, the player’s recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled “Universal Player Tracking System”; U.S. Pat. No. 6,908,387, entitled “Player Tracking Communication Mechanisms in a Gaming Machine”; U.S. Pat. No. 7,311,605, entitled “Player Tracking Assembly for Complete Patron Tracking for Both Gaming and Non-Gaming Casino Activity”; U.S. Pat. No. 7,611,411, entitled “Player Tracking Instruments Having Multiple Communication Modes”; U.S. Pat. No. 7,617,151, entitled “Alternative Player Tracking Techniques”; and U.S. Pat. No. 8,057,298, entitled “Virtual Player Tracking and Related Services”.

Gaming Tables

In certain embodiments, the system employs one or more intelligent gaming tables or gaming chip tracking systems to offer any of the games and/or side bets of the present disclosure. In one embodiment, each intelligent gaming table enables one or more players to play one or more suitable ETG games by placing one or more wagers utilizing such gaming chips. Such ETG game play and/or wagering information is tracked by the intelligent gaming table and provided to a server. In another embodiment, the server is in communication with at least one player tracking system to identify at least one player currently placing at least one wager on at least one suitable game at at least one of the intelligent gaming tables in the system.

In another embodiment, the gaming tables utilized in the system are non-intelligent gaming tables (wherein the gaming chip identification devices are not directly integrated or situated in or on the gaming tables) that enable play of any of the games and/or side bets of the present disclosure. In this embodiment, one or more gaming chip identification devices are utilized to track each player’s wagered gaming chips. In one such embodiment, gaming chip identification devices are located at, above or below the table. In another such embodiment, the gaming chip identification devices are attached to the gaming table or adjacent to the gaming table. In another such embodiment, the gaming chip identification devices are included in the gaming table. In these embodiments, gaming establishments do not have to purchase new gaming tables. Rather, gaming establishments may continue using the same gaming tables and install the intelligent table technology around one or more gaming tables.

Figure 5:
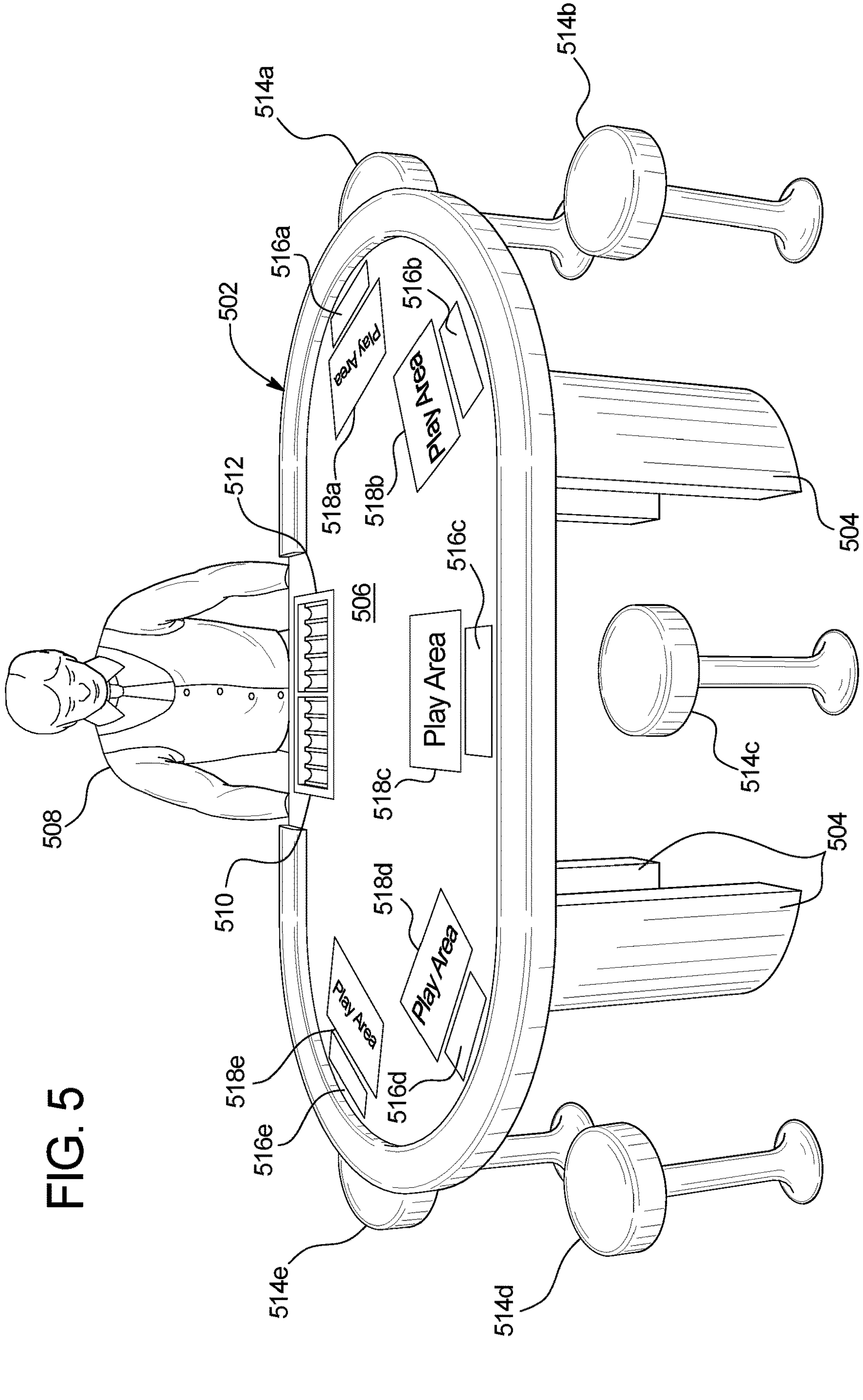
FIG. 5 is a perspective view of one embodiment of a gaming table of the present disclosure.

In one embodiment, as illustrated in FIG. 5, a gaming table 502 includes a suitable support structure 504, such as one or more legs, a playing surface 506 and a dealer position 508. In one embodiment, the dealer position includes two different gaming chip trays 510 and 512 for holding several stacks of the dealer’s gaming chips. The dealer may use the gaming chip trays to collect and store gaming chips, make change for a player, and/or distribute gaming chips upon a gaming chip distribution event associated with a gaming table component. The gaming table includes a plurality of player stations or seats 514*a*, 514*b*, 514*c*, 514*d* and 514*e*. In this example, there are five player stations or seats. It should be appreciated that the gaming table may accommodate any suitable number of player positions and players so as not to interfere with game play. In one embodiment, the gaming table includes a plurality of gaming chip holding areas 516*a*, 516*b*, 516*c*, 516*d* and 516*e* where the players hold their gaming chips. In certain embodiment, the gaming tables include wagering areas (not illustrated) where players place their bets. It should be appreciated that the gaming table may also include a community wagering area (not illustrated) where each of the players place their wagers. In one embodiment, the gaming table also includes a plurality of playing areas 518*a*, 518*b*, 518*c*, 518*d* and 518*e* associated with each of the player stations.

In one embodiment, cards are dealt by the dealer substantially within the respective playing areas, such that cards dealt to a first player position are not confused with cards dealt to a second different player position. It should be appreciated that games played at the gaming tables may include any suitable card game or any suitable non-card game, such as roulette and craps. The gaming tables are operable to include any suitable apparatuses or components of the games. It should be appreciated that different gaming tables in the system may include the same game components or different game components.

In one embodiment, one or more gaming tables in the system each include at least one processor and at least one memory device, including, but not limited to the processors and memory devices of the gaming table component described above. In one embodiment, the system of gaming tables is integrated with one or more player tracking systems. In this embodiment, the system and/or player tracking system is operable to track any participating player's gaming activity at each gaming table of the system. In one such embodiment, the system and/or the associated player tracking system timely tracks when a player inserts their playing tracking card to begin a gaming session and also timely tracks when a player removes their player tracking card, stops playing at the gaming table or cashes out when concluding play for that gaming session. In another embodiment, the dealer or host logs the player in and out. In one such embodiment, at the start of a gaming session, the player hands the player's tracking card to the dealer and the dealer or host logs the player in and out for a gaming session. In different embodiments, the system works in accordance with the player tracking system to maintain data about players.

In other embodiments, rather than requiring a player to insert a player tracking card or enter identifying information, the gaming table utilizes one or more portable devices carried by a player, such as a cell phone, email communication device, a radio frequency identification tag or any other suitable wireless device to track when a player begins and ends a gaming session. In other embodiments, the gaming table utilizes any suitable biometric technology or ticket technology to track when a player begins and ends a gaming session. Each of the gaming tables may include any suitable number of player tracking input devices, such as card readers or key pads to enter identification numbers. In one embodiment, each player station or seat includes an individual player tracking input device. In another embodiment, a gaming table includes a single player tracking input device. In another embodiment, only a dealer has access to the player tracking input device and inputs all of each player's information.

It should be appreciated that the intelligent table system of the present disclosure may include any suitable components or devices to monitor the players' gaming activity. That is, the intelligent table systems tracks how much a player wagers or how many gaming chips a player wagers, how much a player has won or lost, how many gaming chips the player has on the gaming table, or any other desired tracking information. In one embodiment, the intelligent table system also tracks this information for each and every game played by the player. It should be appreciated that the intelligent table system may include any suitable gaming table areas with gaming chip identification devices, any suitable method of identifying the gaming chips, and may use any suitable gaming chip reading technology.

In one embodiment, the intelligent gaming tables or gaming chip tracking systems tracks, monitors and records game play occurring at one or more gaming table player stations, regardless of which player is currently playing at each gaming station. In another embodiment, the intelligent gaming tables or gaming chip tracking systems tracks, monitors and records game play of one or more players at such gaming tables. In this embodiment, the player tracking system identifies players and records or saves the game play information provided by the intelligent tables in specific player accounts.

In another embodiment, the intelligent gaming table of the present disclosure employs a virtual gaming table. The virtual gaming table provide virtual playing cards and/or virtual gaming chips which enable one or more players to play one or more games at the intelligent gaming table. In one embodiment, such virtual gaming tables can utilize one or more surface computing mechanisms, one or more cameras and one or more of a plurality of display devices to provide these games. In one such embodiment, an intelligent gaming table includes an acrylic top and employs a plurality of infrared cameras and a DLP projector with wireless networks to display and detect objects and movement. In this embodiment, as players move their hands or objects on the table top, the cameras translate the motions into commands.

It should be appreciated that values may be assigned to gaming chips in any suitable manner. In one embodiment, different denominations of gaming chips are visually different, such as having the value displayed on the gaming chip, having different sizes and/or having different weights. In another such embodiment, each gaming chip is associated with one of a plurality of different values. In this embodiment, the intelligent table system identifies the individual gaming chips (such as using RFID technology described herein), determines the placement of each gaming chip and sends the information to the player tracking system or central controller about each of the specific gaming chips. In one embodiment, the server associates the value of the gaming chip with the player tracking account.

In one embodiment, each of the gaming chips has or is associated with an identification number. The intelligent table system determines the gaming chip identification number upon play or win of a gaming chip or upon the evaluation of all of the gaming chips in a player's gaming chip identification area. The intelligent table system sends the gaming chip information to the server. The system associates the gaming chip number with the amount and the player. For example, a first player's gaming chip identification area includes gaming chip number 876543 which is associated with the value of $1, gaming chip number 876545 which is associated with the value of $5 and gaming chip number 876547 which is associated with the value of $10. In one embodiment, the intelligent table system determines which gaming chips are in which identification area and sends the information to the server. The system associates the gaming chip numbers with their value and uses the information to determine one or more aspects of game play.

The intelligent table system of the present disclosure is operable to use a variety of types of technology to track player activity. More specifically, in one embodiment, the intelligent table system is operable to include one or more gaming chip identifying devices. In one embodiment, the intelligent table system uses Infra-red signals received from table game gaming chips to track activity. In another embodiment, as indicated above, the intelligent table system employs RFID to track gaming chip activity. The RFID is a system that uses a small electronic device that includes a small gaming chip and an antenna. The gaming chips are scanned at the gaming table to retrieve the identifying information. In another embodiment, the system uses optical technology. The system may use any suitable other gaming chip identification devices, which may use any suitable gaming chip identification technology, to determine player gaming table wagering activities. The gaming chips are tracked for total gaming chip movement or wins and losses. When each gaming chip is placed in a gaming chip identification area, such as a betting circle or in a player's betting or wagering area, gaming chip identification devices recognizes the gaming chip and relays this data to the intelligent table system.

The system of the present disclosure contemplates a plurality of different methods that the gaming chips may be used and/or identified during game play. In one embodiment, a gaming chip identification area is a gaming chip holding area. In one embodiment, intelligent table system identifies all of the gaming chips in a player's gaming chip holding area. For example, during game play, a player is required to have all gaming chips in that player's possession in a gaming chip holding area which each include one or more gaming chip identification devices. Upon a game play checkpoint, such as at a designated time interval, upon a triggering event, at the end of a play of a game or at the end of a gaming session, the intelligent table system surveys each of the player's gaming chip holding areas to identify the players' gaming chips.

In one embodiment, the gaming chip identification area is a wagering area. In one embodiment, the system includes gaming chip identification devices in each player's wagering area. The system identifies either the specific gaming chips wagered and won or loss by that player or the number of gaming chips wagered and won or loss by the player. For example, a player logs into the player tracking system via a card slot at the player's player station at a gaming table. When a player places a gaming chip in the wagering area associated with that player station, the intelligent table system identifies that gaming chip. When a dealer or host provides a gaming chip to a player for a win, the intelligent table system identifies the gaming chip.

In another embodiment, both the gaming chip holding area and the wagering area include gaming chip identification devices. That is, the system is operable to identify gaming chips in both the gaming chip holding area and the wagering area. Therefore, the system double checks or verifies each player's gaming activity.

In one embodiment, the system associates the gaming activity directly with players via player accounts. For example, at the start of play, the player logs into the player tracking system, such as by inserting a player tracking card into a card reader associated with their player station on the gaming table. In this embodiment, the intelligent table system associates any tracked data with the player's specific account. Thus, in certain embodiments, tracking player activity at the gaming table is similar in accuracy and thoroughness to the tracking done at slot machines.

Alternatively, the system determines the gaming chip count at each player station. That is, the system enables players to play anonymously and be associated with their current place at the table. For example, a player does not have to log in for one or more plays of a game but rather remains at a same player station for such plays of the game. The system associates the gaming chips with the player stations.

In certain embodiments, the intelligent table system includes one or more card readers or a card reading system. The card reading system knows what card comes out of the shoe and is dealt to what player. In one embodiment, the card reading system is a part of the intelligent table system. In another embodiment, the card reading system is separate from the intelligent table system and in association with the intelligent table system detects betting patterns and decisions to provide to the player tracking system. Such betting patterns and decisions may qualify the player to win one or more bonus awards. The card reading system can also reduce dealer error and or possible corruption by making sure that the players are paid properly for each and every hand. In certain embodiments, the intelligent table system knows the player cards, the dealer cards, and the bet, the intelligent table system is enabled to determine correct payouts for each and every player at the gaming table. In certain embodiments, the system employs safeguards to make sure the correct payout is made. For example, the system can send a halt play signal if an error is detected. It should be appreciated that in different embodiments the card reading system and the intelligent table system are integrated with or included in one or more tracking systems or player tracking systems.

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique player name and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable nonmonetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. Such changes and modifications can be made without departing from the spirit and scope of the present subject matter and without diminishing its intended technical scope. It is therefore intended that such changes and modifications be covered by the appended claims.

What is claimed is:

1. A system comprising:
- a processor; and
- a memory device that stores a plurality of instructions that, when executed by the processor following a wager placed on a play of a baccarat game, cause the processor to:
  - enable a placement of an additional wager,
  - determine playing cards of a player's hand of the play of the baccarat game,
  - determine playing cards of a banker's hand of the play of the baccarat game, and
  - responsive to the placement of the additional wager:
    - determine, based on a quantity of any playing cards having a designated value in the player's hand and the banker's hand, a value of the player's hand and a value of the banker's hand, any award associated with the placed additional wager, and
    - communicate data that results in a display, by a display device, of any award associated with the placed additional wager.

2. The system of claim 1, wherein the placed additional wager is associated with a first award when a first quantity of playing cards having the designated value are in the player's hand and the banker's hand, the value of the player's hand is different from the designated value and the value of the banker's hand is different from the designated value.

3. The system of claim 2, wherein the placed additional wager is associated with a second award when the first quantity of playing cards having the designated value are in the player's hand and the banker's hand, the value of the player's hand is equal to the designated value and the value of the banker's hand is different from the designated value, the second award being greater than the first award.

4. The system of claim 3, wherein the placed additional wager is associated with the second award when the first quantity of playing cards having the designated value are in the player's hand and the banker's hand, the value of the player's hand is different from the designated value and the value of the banker's hand is equal to the designated value.

5. The system of claim 3, wherein the placed additional wager is associated with a third award when the first quantity of playing cards having the designated value are in the player's hand and the banker's hand, the value of the player's hand is equal to the designated value and the value of the banker's hand is equal to the designated value, the third award being greater than the second award.

6. The system of claim 3, wherein the placed additional wager is associated with the second award when a second, greater quantity of playing cards having the designated value are in the player's hand and the banker's hand, the value of the player's hand is different from the designated value and the value of the banker's hand is different from the designated value.

7. The system of claim 6, wherein the placed additional wager is associated with a third award when the second, greater quantity of playing cards having the designated value are in the player's hand and the banker's hand, the value of the player's hand is equal to the designated value and the value of the banker's hand is different from the designated value, the third award being greater than the second award.

8. The system of claim 1, wherein the play of the baccarat game is associated with a gaming table.

9. The system of claim 1, wherein the additional wager is placed via an input device housed by a cabinet of an electronic table game terminal.

10. A system comprising:
- a processor; and
- a memory device that stores a plurality of instructions that, when executed by the processor responsive to a receipt of data of a side wager placed in association with a play of an electronic table baccarat game, cause the processor to:
  - determine any award associated with the side wager placed, the determination being based on each of:
    - a quantity of any playing cards having a designated value in a player's hand of the play of the electronic table baccarat game,
    - a quantity of any playing cards having the designated value in a banker's hand of the play of the electronic table baccarat game,
    - a value of the player's hand of the play of the electronic table baccarat game and
    - a value of the banker's hand of the play of the electronic table baccarat game, and
  - communicate data that results in a display, by a display device, of any award associated with the side wager placed.

11. The system of claim 10, wherein the playing card having the designated value comprises a playing card having a rank of eight.

12. A method of operating a system, the method comprising:
- following a wager placed on a play of a baccarat game:
  - enabling, by a processor, a placement of an additional wager,
  - determining, by the processor, playing cards of a player's hand of the play of the baccarat game,
  - determining, by the processor, playing cards of a banker's hand of the play of the baccarat game, and
  - responsive to the placement of the additional wager:
    - determining, by the processor and based on a quantity of any playing cards having a designated value in the player's hand and the banker's hand, a value of the player's hand and a value of the banker's hand, any award associated with the placed additional wager, and displaying, by a display device, any award associated with the placed additional wager.

13. The method of claim 12, wherein the placed additional wager is associated with a first award when a first quantity of playing cards having the designated value are in the player's hand and the banker's hand, the value of the player's hand is different from the designated value and the value of the banker's hand is different from the designated value.

14. The method of claim 13, wherein the placed additional wager is associated with a second award when the first quantity of playing cards having the designated value are in the player's hand and the banker's hand, the value of the player's hand is equal to the designated value and the value of the banker's hand is different from the designated value, the second award being greater than the first award.

15. The method of claim 14, wherein the placed additional wager is associated with the second award when the first quantity of playing cards having the designated value are in the player's hand and the banker's hand, the value of the player's hand is different from the designated value and the value of the banker's hand is equal to the designated value.

16. The method of claim 14, wherein the placed additional wager is associated with a third award when the first quantity of playing cards having the designated value are in the player's hand and the banker's hand, the value of the player's hand is equal to the designated value and the value of the banker's hand is equal to the designated value, the third award being greater than the second award.

17. The method of claim 14, wherein the placed additional wager is associated with the second award when a second, greater quantity of playing cards having the designated value are in the player's hand and the banker's hand, the value of the player's hand is different from the designated value and the value of the banker's hand is different from the designated value.

18. The method of claim 17, wherein the placed additional wager is associated with a third award when the second, greater quantity of playing cards having the designated value are in the player's hand and the banker's hand, the value of the player's hand is equal to the designated value and the value of the banker's hand is different from the designated value, the third award being greater than the second award.

19. The method of claim 12, wherein the play of the baccarat game is associated with an electronic gaming table.

20. The method of claim 12, wherein at least the additional wager is placed via an input device housed by a cabinet of an electronic table game terminal.

* * * * *